United States Patent
Cavanna et al.

(10) Patent No.: US 9,755,907 B2
(45) Date of Patent: Sep. 5, 2017

(54) MANAGING A SWITCH FABRIC

(75) Inventors: Vincent E. Cavanna, Loomis, CA (US); Michael G. Frey, Granite Bay, CA (US)

(73) Assignee: HEWLETT PACKARD ENTERPRISE DEVELOPMENT LP, Houston, TX (US)

(*) Notice: Subject to any disclaimer, the term of this patent is extended or adjusted under 35 U.S.C. 154(b) by 456 days.

(21) Appl. No.: 14/238,573

(22) PCT Filed: Sep. 28, 2011

(86) PCT No.: PCT/US2011/053710
§ 371 (c)(1),
(2), (4) Date: Feb. 12, 2014

(87) PCT Pub. No.: WO2013/048393
PCT Pub. Date: Apr. 4, 2013

(65) Prior Publication Data
US 2014/0198631 A1    Jul. 17, 2014

(51) Int. Cl.
*H04L 12/26*    (2006.01)
*H04L 12/24*    (2006.01)
(Continued)

(52) U.S. Cl.
CPC .............. *H04L 41/12* (2013.01); *H04L 41/06* (2013.01); *H04L 41/0806* (2013.01);
(Continued)

(58) Field of Classification Search
CPC . H04L 41/06; H04L 41/0672; H04L 41/0806; H04L 41/12; H04L 49/25;
(Continued)

(56) References Cited

U.S. PATENT DOCUMENTS 6,597,656 B1    7/2003  Blanc et al.
6,728,777 B1    4/2004  Lee et al.
(Continued)

FOREIGN PATENT DOCUMENTS

| CN | 1533655 A | 9/2004 |
|---|---|---|
| EP | 0680178 A1 | 11/1995 |
| WO | WO 2010018361 | * 2/2010 |

OTHER PUBLICATIONS

Cisco Systems, Inc., Cisco Nexus 7000 Series NX-OS High Availability and Redundancy Guide: Overview [online], Jul. 27, 2009, Retrieved from the Internet <http://www.cisco.com/en/US/docs/switches/datacenter/sw/5_n x/nx-os/high_availability/configuration/guide/ha_overview.html#wp1082864> [retreieved on Jan. 23, 2014].

(Continued)

*Primary Examiner* — Kwang B Yao
*Assistant Examiner* — Harun Chowdhury
(74) *Attorney, Agent, or Firm* — Hewlett Packard Enterprise Patent Department (57) ABSTRACT

In a method for managing a switch fabric comprising a plurality of fabric chips, each of said plurality of fabric chips comprising a plurality of port interfaces, a first configuration set and a second configuration set, each comprising a plurality of configuration registers for the port interfaces to use in calculating a port resolution for an incoming packet, are generated. In addition, a determination as to which of the first configuration set and the second configuration set the plurality of fabric chips are to use is made an instruction is communicated to each of the fabric chips to use the determined one of the first configuration set and the second configuration set.

15 Claims, 8 Drawing Sheets

(51) Int. Cl.
*H04L 12/931* (2013.01)
*H04L 12/933* (2013.01)

(52) U.S. Cl.
CPC ........ *H04L 41/0893* (2013.01); *H04L 49/101* (2013.01); *H04L 49/65* (2013.01); *H04L 41/0672* (2013.01); *H04L 41/0836* (2013.01)

(58) Field of Classification Search
CPC ..... H04L 49/65; H04L 49/101; H04L 49/253; H04L 49/557; H04L 49/1515; H04L 49/3009; H04L 41/0893
USPC ........ 370/217, 218, 230, 235, 244, 254, 360
See application file for complete search history.

(56) References Cited

U.S. PATENT DOCUMENTS

| | | | |
|---|---|---|---|
| 6,751,219 B1 | 6/2004 | Lipp et al. | |
| 6,819,654 B2 | 11/2004 | Soloway et al. | |
| 7,089,293 B2 | 8/2006 | Grosner et al. | |
| 7,164,652 B2 | 1/2007 | Puppa et al. | |
| 7,184,403 B1* | 2/2007 | Morishige | H04L 49/3009 370/235 |
| 7,251,217 B2 | 7/2007 | Wong et al. | |
| 7,292,535 B2 | 11/2007 | Folkes et al. | |
| 7,317,722 B2 | 1/2008 | Aquino et al. | |
| 7,403,484 B2 | 7/2008 | Goodfellow et al. | |
| 7,430,164 B2 | 9/2008 | Bare | |
| 7,469,279 B1 | 12/2008 | Stamler et al. | |
| 7,480,258 B1 | 1/2009 | Shuen et al. | |
| 7,519,054 B2 | 4/2009 | Varma | |
| 7,570,603 B2 | 8/2009 | Fan et al. | |
| 7,577,089 B2 | 8/2009 | Varada et al. | |
| 7,581,035 B1 | 8/2009 | Oliveira et al. | |
| 7,680,107 B2 | 3/2010 | Kalkunte | |
| 7,760,732 B2 | 7/2010 | Bhargava et al. | |
| 8,879,397 B2* | 11/2014 | Xi | H04L 43/0882 370/237 |
| 2002/0133756 A1 | 9/2002 | Jain | |
| 2002/0159468 A1 | 10/2002 | Foster et al. | |
| 2004/0078467 A1 | 4/2004 | Grosner et al. | |
| 2005/0002334 A1* | 1/2005 | Chao | H04L 49/253 370/230 |
| 2005/0254490 A1 | 11/2005 | Gallatin et al. | |
| 2007/0101379 A1 | 5/2007 | Pereira | |
| 2008/0074996 A1 | 3/2008 | Fourcand | |
| 2009/0003320 A1 | 1/2009 | Luo et al. | |
| 2009/0232492 A1 | 9/2009 | Blair et al. | |
| 2009/0245258 A1 | 10/2009 | Tanaka et al. | |

OTHER PUBLICATIONS

International Search Report and Written Opinion, Apr. 13, 2012, PCT Application No. PCT/US2011/053710.

Office Action, CN Application No. 201180073165.6, Date: Jan. 27, 2016, pp. 1-8.

* cited by examiner

MANAGING A SWITCH FABRIC

CROSS-REFERENCE TO RELATED APPLICATION

This application is a U.S. National Stage Application of and claims priority to International Patent Application No. PCT/US2011/053710, filed on Sep. 28, 2011, and entitled "MANAGING A SWITCH FABRIC".

BACKGROUND

Computer performance has increased and continues to increase at a very fast rate. Along with the increased computer performance, the bandwidth capabilities of the networks that connect the computers together have and continue to also increase significantly. Ethernet-based technology is an example of a type of network that has been modified and improved to provide sufficient bandwidth to the networked computers. Ethernet-based technologies typically employ network switches, which are hardware-based devices that control the flow of packets based upon destination address information contained in the packets. In a switched fabric, network switches connect with each other through a fabric, which allows for the building of network switches with scalable port densities. The fabric typically receives data from the network switches and forwards the data to other connected network switches.

BRIEF DESCRIPTION OF THE DRAWINGS

Features of the present disclosure are illustrated by way of example and not limited in the following figure(s), in which like numerals indicate like elements, in which:

FIG. 6 shows a flow diagram of a method for using one of the first configuration set and the second configuration set, according to an example of the present disclosure; and.

DETAILED DESCRIPTION

For simplicity and illustrative purposes, the present disclosure is described by referring mainly to an example thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "n" and "m" following a reference numeral is intended to denote an integer value that is greater than 1. In addition, ellipses (" . . . ") in the figures are intended to denote that additional elements may be included between the elements surrounding the ellipses. Moreover, the terms "a" and "an" are intended to denote at least one of a particular element. As used herein, the term "includes" means includes but not limited to, the term "including" means including but not limited to. The term "based on" means based at least in part on.

Disclosed herein are a method, controller and computer readable storage medium having stored thereon a method for managing a switch fabric for efficient re-convergence in the switch fabric following, for instance, an automatic fabric reroute or similar fabric rerouting technologies. More particularly, the features recited herein enable a topology change in the switch fabric from an old topology configuration to be generated and used in a relatively seamless manner. In other words, the features recited herein enable the topology change to be generated and used in a relatively graceful manner that does not substantially interrupt the traffic flow through the switch fabric.

The switch fabric disclosed herein is composed of a plurality of fabric chips, in which, each of the fabric chips contains a respective set of port interfaces interconnected to each other through a crossbar. The port interfaces in each of the fabric chips is to perform port calculation operations to determine which of the other port interfaces is to receive the packets over the crossbar. For example, the port interfaces may apply a bit-mask to an identification of destination node chip(s) contained in the packet to determine the bit(s) identified in the packet and to determine which of the port interface(s) on the opposite side of the crossbar is to receive the packet. In this example, each of the port interfaces corresponds to a particular bit identified in the packet. More particularly, for instance, the bit-mask may identify which of the port interfaces are to receive the packet from the port interface that received the packet based upon the destination node chips identified in the packet. In this regard, the bit-masks applied by the port interfaces may differ for each of the fabric chips.

According to an example, the bit-masks applied by the port interfaces are varied to re-optimize flow of packets through the switch fabric following changes to the switch fabric. The changes to the switch fabric may include purposeful changes, such as, the addition and/or removal of a fabric chip, changes to cabling between the fabric chips, etc. The changes may also occur through a fault or other failure in the switch fabric, such as, when a link between fabric chips fails. The re-optimization of the flow of the packets may include varying the flow of the packets through the fabric chips such that the number of hops over the fabric chips required for the packets to reach destination node chips is substantially minimized.

As discussed in greater detail herein below, the bit-masks or configuration registers that the port interfaces apply are contained in different configuration sets. Thus, a first configuration set comprises a different set of configuration registers to be applied by the port interfaces as compared with a second configuration set. Thus, depending upon which configuration set the port interfaces uses, different sets of bit-masks will be applied on the packets, which may cause the packets to traverse different paths through the switch fabric. The port interfaces in the fabric chips may store multiple different configuration sets and may be instructed as to which of the different configuration sets is to be used at a particular time. In addition, or alternatively, the port interfaces may be programmed to use a different configuration set as conditions change in the switch fabric, such as, for instance, following a fault detection in at least one of the fabric chips.

According to an example, a switch fabric management apparatus includes machine readable instructions for generating the different configuration sets, for determining which of the configuration sets to use, and for communicating the different configuration sets and which of the configuration sets is to be used to the port interfaces of the fabric chips. The switch fabric management apparatus may also communicate instructions to the port interfaces as to which of the configuration sets the port interfaces are to use their port resolution calculations.

The port interfaces may store the different configuration sets and each of the different configuration sets may correspond to a particular bit. In this regard, the particular bit may be set to indicate that the configuration set corresponding to that particular bit is to be used. In addition, the packets that are received into the port interface are provided with a pointer that identifies which of the configuration sets is to be used on those packets. In this regard, packets that were received prior to the configuration set change include a pointer that indicates that the old configuration set was used and packet that are received following the configuration set change include a pointer indicating that the new configuration set was used in the port resolution calculations.

As used herein, packets may comprise data packets and/or control packets. According to an example, packets comprise data and control mini-packets (MPackets), in which control mpackets are Requests or Replies and data mpackets are Unicast and/or Multicast.

Figure 1:
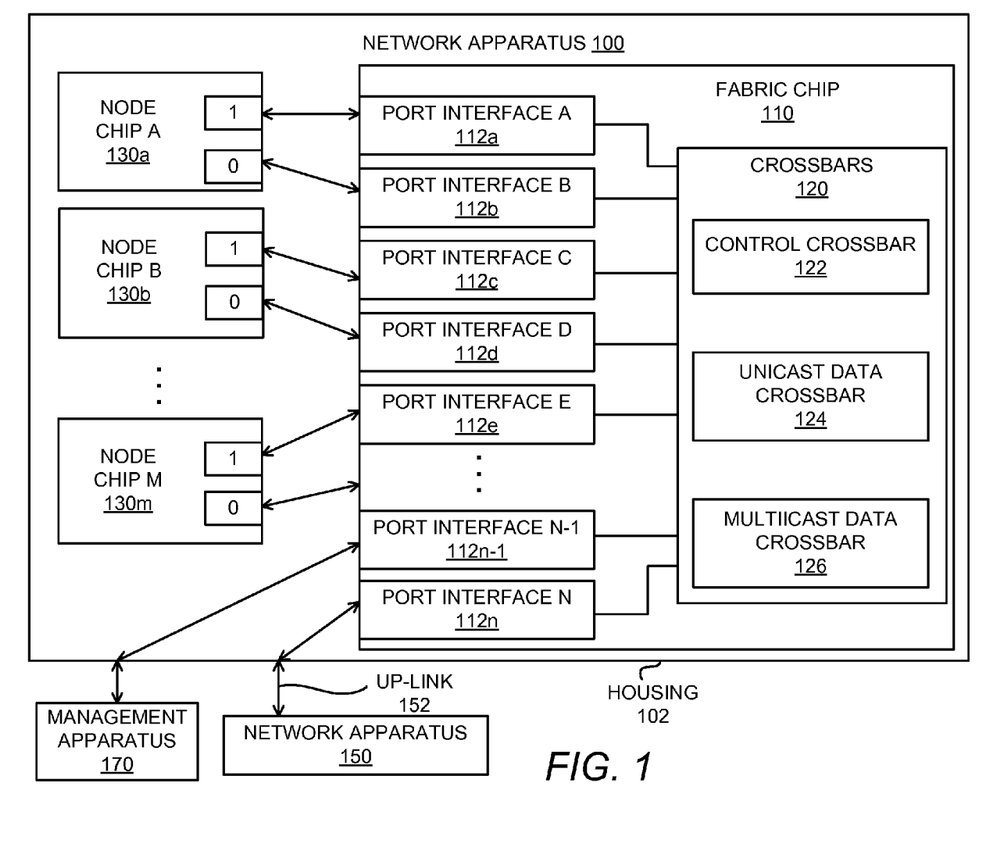
FIG. 1 illustrates a simplified schematic diagram of a network apparatus, according to an example of the present disclosure.

With reference first to FIG. 1, there is shown a simplified diagram of a network apparatus 100, according to an example. It should be readily apparent that the diagram depicted in FIG. 1 represents a generalized illustration and that other components may be added or existing components may be removed, modified or rearranged without departing from a scope of the network apparatus 100.

The network apparatus 100 generally comprises an apparatus for performing networking functions, such as, a network switch, or equivalent apparatus. In this regard, the network apparatus 100 may comprise a housing or enclosure 102 and may be used as a networking component. In other words, for instance, the housing 102 may be for placement in an electronics rack or other networking environment, such as in a stacked configuration with other network apparatuses. In other examples, the network apparatus 100 may be inside of a larger ASIC or group of ASICs within a housing. In addition, or alternatively, the network apparatus 100 may provide a part of a fabric network inside of a single housing.

The network apparatus 100 is depicted as including a fabric chip 110 and a plurality of node chips 130a-130m having ports labeled "0" and "1". The fabric chip 110 is also depicted as including a plurality of port interfaces 112a-112n, which are communicatively coupled to respective ones of the ports "0" and "1" of the node chips 130a-130m. The port interfaces 112a-112n are also communicatively connected to a crossbar array 120, which is depicted as including a control crossbar 122, a unicast data crossbar 124, and a multicast data crossbar 126. The port interface 112n is also depicted as being connected to another network apparatus 150, which may include the same or similar configuration as the network apparatus 100. Thus, for instance, the another network apparatus 150 may include a plurality of node chips 130a-130m communicatively coupled to a fabric chip 110. As shown, the port interface 112n is connected to the another network apparatus 150 through an up-link 152. Alternatively, however, the network apparatus 100 and the another network apparatus 150 may communicate to each other through trunked links of a common trunk.

According to an example, the node chips 130a-130m comprise application specific integrated circuits (ASICs) that enable user-ports and the fabric chip 110 to interface each other. Although not shown, each of the node chips 130a-130m may also include a user-port through which data, such as, packets, may be inputted to and/or outputted from the node chips 130a-130m. In addition, each of the port interfaces 112a-112n may include a port through which a connection between a port in the node chip 130a and the port interface 112a may be established. The connections between the ports of the node chip 130a and the ports of the port interfaces 112a-112n may comprise any suitable connection to enable relatively high speed communication of data, such as, optical fibers or equivalents thereof.

According to an example, the fabric chip 110 comprises an ASIC that communicatively connects the node chips 130a-130m to each other. The fabric chip 110 may also comprise an ASIC that communicatively connects the fabric chip 110 to the fabric chip 110 of another network apparatus 150, in which, such connected fabric chips 110 may be construed as back-plane stackable fabric chips. The ports of the port interfaces 112a-112n that are communicatively coupled to the ports of the node chips 130a-130m are described herein as "down-link ports". In addition, the ports of the port interfaces 112a-112n that are communicatively coupled to the port interfaces 112a-112n of the fabric chip 110 in another network apparatus 150 are described herein as "up-link ports".

According to an example, packets enter the fabric chip 110 through a down-link port of a source node chip, which may comprise the same node chip as the destination node chip. The destination node chip may be connected to any fabric chip port in the switch fabric, including the one to which the source node chip is attached. In addition, the packets include an identification of which node chip(s), such as a data-list, a destination node mask, etc., to which the packets are to be delivered by the fabric chip 110. In addition, each of the port interfaces 112a-112n may be assigned a bit and each of the port interfaces 112a-112n may use a port resolution operation to determine which of the port interfaces 112a-112n is to receive the packets. More particularly, for instance, the port interfaces 112a through which the packet was received may apply a bit-mask to the identification of node chip(s) contained in the packet to determine the bit(s) identified in the data and to determine which of the port interface(s) 112b-112n correspond to the determined bit(s). In instances where the packet comprises a uni-cast packet, the port interface 112a may transfer the data over the appropriate crossbar 122-126 to the determined port interface(s) 112b-112n. However, when the packet comprises a multi-cast packet, the port interface 112a may perform additional operations during the port resolution operation to determine which of the port interfaces 112b-112n is/are to receive the multi-cast packet as discussed in greater detail herein below.

Also shown in FIG. 1 is a switch fabric management apparatus 170 that is in communication with the port interfaces 112a-112n. Although the switch fabric management apparatus 170 is depicted as being connected to a single port interface 112n-1, it should be understood that the switch fabric management apparatus 170 is connected to multiple ones or all of the port interfaces 112a-112n without departing from a scope of the fabric chip 110 and the switch fabric management apparatus 170 depicted in FIG. 1. In addition, or alternatively, the switch fabric management apparatus 170 may communicate with the port interfaces 112a-112n through other connections, such as, wirelessly, through the crossbars 120, etc.

In any regard, the switch fabric management apparatus 170 is to perform various functions with respect to the fabric chip 110 and to a switch fabric in which the fabric chip 110 is a member. One of the functions is to generate configuration sets that contain configuration registers, such as, bit-mask sets, that the port interfaces 112a-112n of the fabric chip 110 are to use in calculating port resolutions on packets received through the port interfaces 112a-112n. Another of the functions is to communicate instructions to the port interfaces 112a-112n on which of a plurality of configuration registers to use at a given time. Various manners in which the switch fabric management apparatus 170 may operate are described in greater detail herein below.

Figure 2:
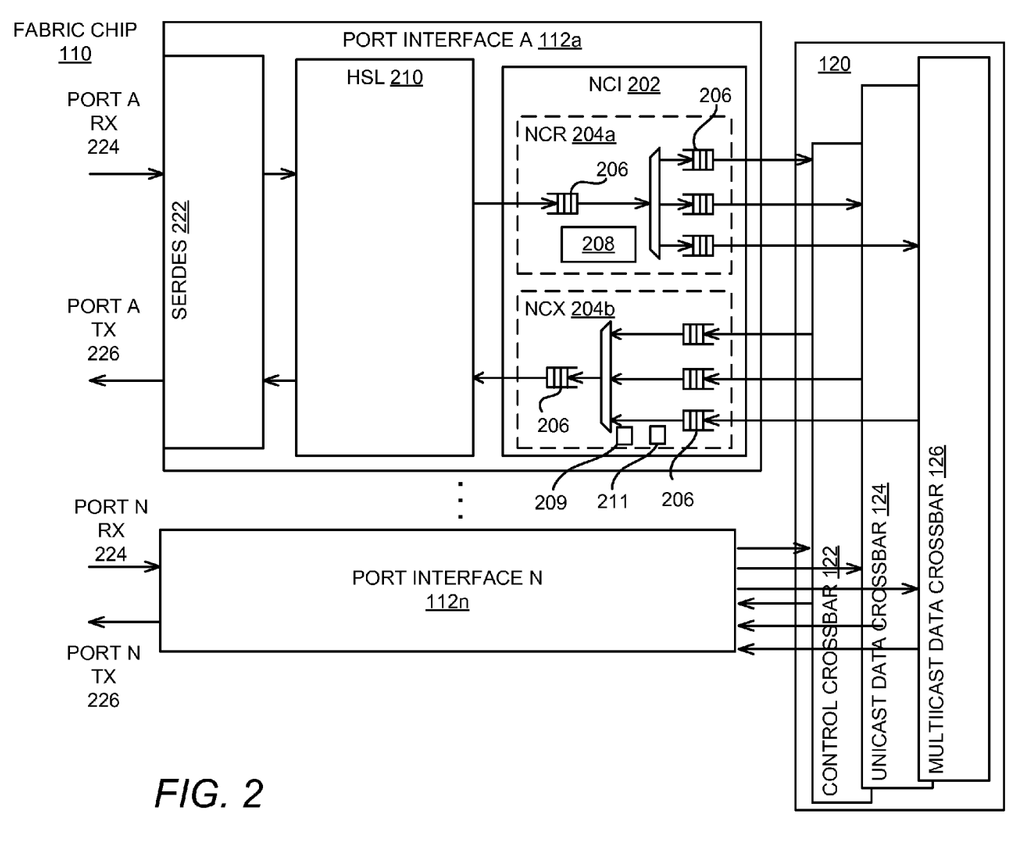
FIG. 2 shows a simplified block diagram of the fabric chip depicted in FIG. 1, according to an example of the present disclosure.

With particular reference now to FIG. 2, there is shown a simplified block diagram of the fabric chip 110 depicted in FIG. 1, according to an example. It should be apparent that the fabric chip 110 depicted in FIG. 2 represents a generalized illustration and that other components may be added or existing components may be removed, modified or rearranged without departing from a scope of the fabric chip 110.

The fabric chip 110 is depicted as including the plurality of port interfaces 112a-112n and the crossbar array 120. The components of a particular port interface 112a are depicted in detail herein, but it should be understood that the remaining port interfaces 112b-112n may include similar components and configurations.

As shown in FIG. 2, the fabric chip 110 includes a network chip interface (NCI) block 202, a high-speed link (HSL) (interface) block 210, and a set of serializers/deserializers (serdes) 222. By way of particular example, the set of serdes 222 includes a set of serdes modules. In addition, the serdes 222 is depicted as interfacing a receive port 224 and a transmit port 226. Alternatively, however, components other than the HSL block 210 and the serdes 222 may be employed in the fabric chip 110 without departing from a scope of the fabric chip 110 disclosed herein.

The NCI block 202 is depicted as including a network chip receiver (NCR) block 204a and a network chip transmitter (NCX) block 204b. The NCR block 204a feeds data received from the HSL block 210 to the crossbar array 120 and the NCX block 204b transfers data received from the crossbar array 120 to the HSL block 210. The NCR block 204a and the NCX block 204b are further depicted as comprising registers 206, in which some of the registers are communicatively coupled to one of the crossbars 122-126 and others of the registers 206 are communicatively coupled to the HSL block 210.

The NCI block 202 generally transfers data and control mini-packets (MPackets) in full duplex fashion between the corresponding HSL block 210 and the crossbar array 120. In addition, the NCI 202 provides buffering in both directions. The NCI block 202 also includes a port resolution module 208 that interprets destination and path information contained in each received MPacket. By way of example, each received MPacket may include a destination-node-chip-mask that the port resolution module 208 may use in performing a port resolution operation to determine the correct destination NCI block 202 in a different port interface 112b-112n of the fabric chip 110, to make the next hop to the correct destination node chip 130a-130m, which may be attached to a down-link port or an up-link port of the fabric chip 110. In this regard, the port resolution module 208 may be programmed with at least one configuration set at a time comprising a configuration register, such as, a bit-mask in which each bit corresponds to one of the port interfaces 112a-112n of the fabric chip 110. In addition, during the port resolution operation, the port resolution module 208 may use the bit-mask in the at least one configuration set on the fabric-port-mask to determine which bits, and thus, which of the port interfaces 112b-112n on the opposite side of the crossbars 120, are to receive the packet. In addition, the port resolution module 208 interprets the destination and path information, determines the correct NCI block 202, and determines the ports to which the packet is to be outputted independently of external software. In other words, the port resolution module 208 need not be controlled by external software to perform these functions. However, the port resolution module 208 may receive the at least one configuration set from an external software.

The port resolution module 208 may be programmed with machine-readable instructions that, when executed, cause the port resolution module 208 to determine that a first path in the switch fabric along which the packet is to be communicated toward the destination node is unavailable, to determine whether another path in the switch fabric along which the packet is to be communicated toward the destination node chip that does not include the source fabric chip is available, in response to a determination that the another path is available, to communicate the packet along the another path, and in response to a determination that the another path is unavailable, to communicate the packet back to the source fabric chip. In this regard, the port resolution module 208 is only to communicate the packet back to the source fabric chip if there are no other available paths for the packet to take to reach the destination node chip.

The port resolution module 208 may also be programmed to communicate information pertaining to a status of the communication of packets to the switch fabric management apparatus 170. Thus, for instance, the port resolution module 208 may provide the switch fabric management apparatus 170 with information indicating that the path through which the packet was to be communicated toward the destination node chip is unavailable. As discussed in greater detail herein below, the switch fabric management apparatus 170 is to process the information received from the port resolution module 208 and to generate a new configuration set that contains a set of configuration registers that substantially optimizes the flow of packets through a switch fabric. Thus, for instance, instead of causing a packet to flow in one direction of the switch fabric and backtrack in an opposite direction in the switch fabric due to a failed link, the switch fabric management apparatus 170 may generate a new configuration register for the port resolution module 208 that causes the packet to initially flow in the opposite direction, thereby reducing the distance of the path taken by the packet in reaching its intended destination.

The NCX block 204b also includes a node pruning module 209 and a unicast conversion module 2011 that operates on packets received from the multicast data crossbar 126. More particularly, the unicast conversion module 211 is to process the packets to identify a data word in the data that the node-chip on the down-link will need for that packet. In addition, the node pruning module 209 is to prune a destination node chip mask to a subset of the bits that represent which node chips are to receive a packet such that only destination node chips 130a-130m that were supposed to traverse the port are still included in the chip mask. Thus, for instance, if the NCX block 204b receives a multi-cast packet listing a chip node 130a of the fabric chip 110 and a chip node 130 attached to another network apparatus 150, the NCX block 204b may prune the data-list of the multi-cast packet to remove the chip node 130a of the fabric chip 110 prior to the multi-cast packet being sent out to the another apparatus 150.

The HSL block 210 generally operates to initialize and detect errors on the hi-speed links, and, if necessary, to re-transmit data. According to an example, the data path between the NCI block 202 and the HSL block 210 is 64 bits wide in each direction.

Figure 3A:
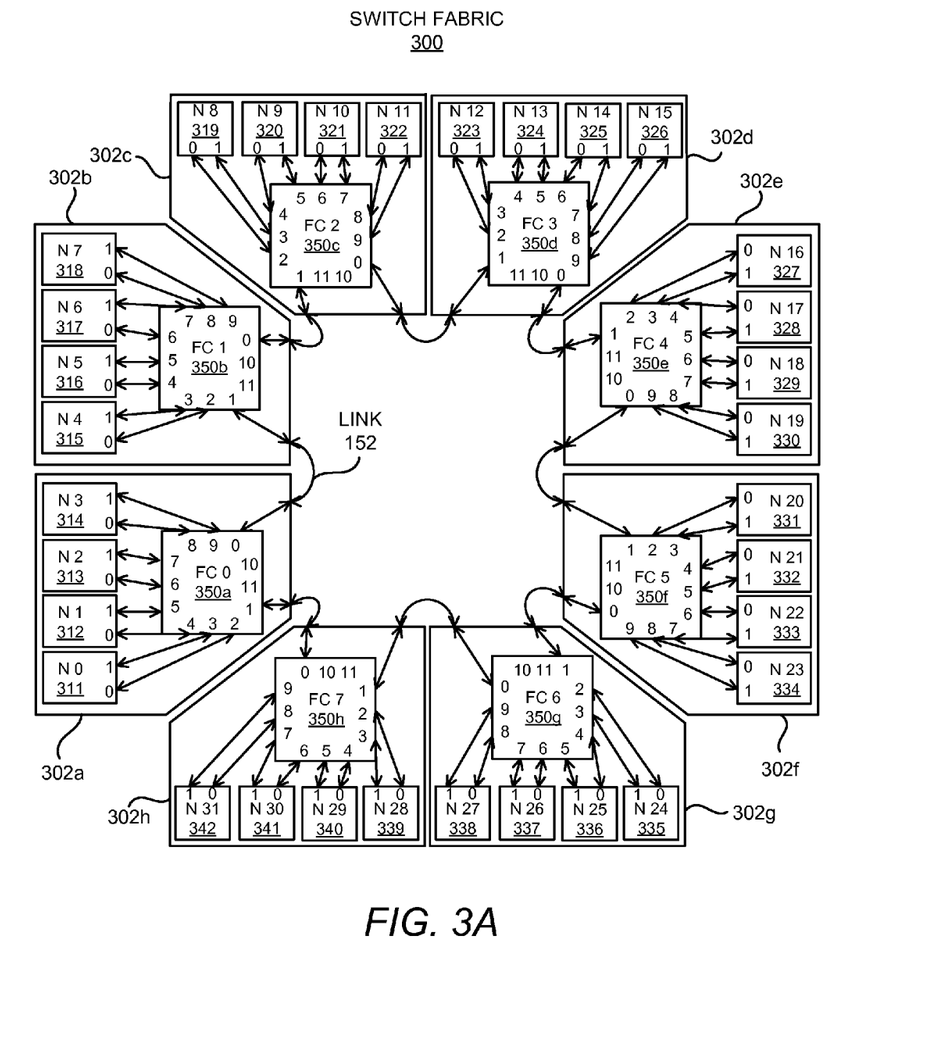
FIGS. 3A and 3B, respectively, show simplified block diagrams of switch fabrics, according to examples of the present disclosure.
Figure 3B:
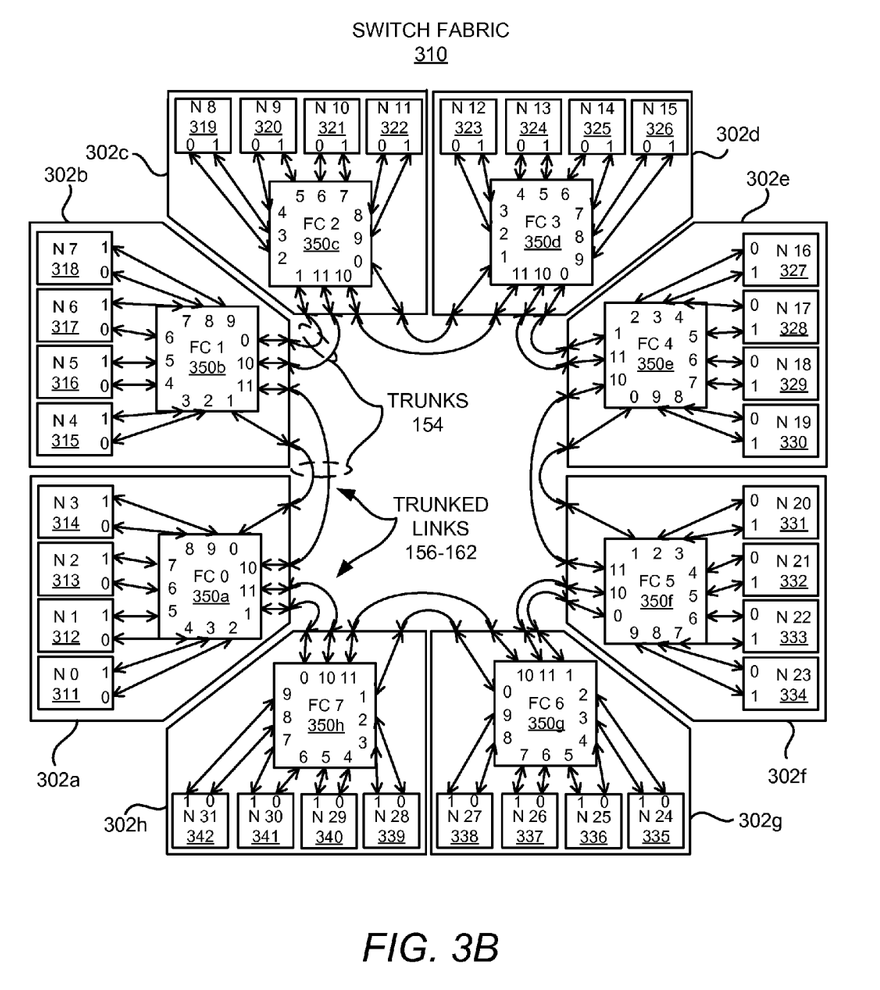

Turning now to FIGS. 3A and 3B, there are respectively shown simplified block diagrams of switch fabrics 300 and 310, according to two examples. It should be apparent that the switch fabrics 300 and 310 depicted in FIGS. 3A and 3B represent generalized illustrations and that other components may be added or existing components may be removed, modified or rearranged without departing from the scopes of the switch fabrics 300 and 310.

The switch fabrics 300 and 310 are depicted as including eight network apparatuses 302a-302h. Each of the network apparatuses 302a-302h is also depicted as including a respective fabric chip (FC0-FC7) 350a-350h. Each of the network apparatuses 302a-302h may comprise the same or similar configuration as the network apparatus 100 depicted in FIG. 1. In addition, each of the fabric chips 350a-350h may comprise the same or similar configuration as the fabric chip 110 depicted in FIG. 2. Moreover, although particular numbers of network apparatuses 302a-302h have been depicted in FIGS. 3A and 3B, it should be understood that the switch fabrics 300 and 310 may include any number of network apparatuses 302a-302h arranged in any number of different configurations with respect to each other without departing from scopes of the switch fabrics 300 and 310.

In any regard, as shown in the switch fabrics 300 and 310, the network apparatuses 302a-302h are each depicted as including four node chips (N0-N31) 311-342. Each of the node chips (N0-N31) 311-342 is depicted as including two ports (0, 1), which are communicatively coupled to a port (0-11) of at least one respective fabric chip 350a-350h. More particularly, each of the ports of the node chips 311-342 is depicted as being connected to one of twelve ports 0-11, in which each of the ports 0-11 is communicatively coupled to a port interface 112a-112n. In addition, the node chips 311-342 are depicted as being connected to respective fabric chips 350a-350h through bi-directional links. In this regard, data may flow in either direction between the node chips 311-342 and their respective fabric chips 350a-350h.

As discussed above with respect to FIG. 1, the ports of the fabric chips 350a-350h that are connected to the node chips 311-342 are termed "down-link ports" and the ports of the fabric chips 350a-350h that are connected to other fabric chips 350a-350h are termed "up-link ports". Each of the up-link ports and the down-link ports of the fabric chips 350a-350h includes an identification of the destination node chips 311-342 that are intended to be reached through that link. In addition, the packets supplied into the switch fabrics 300, 400, and 410 include with them an identification of the node chip(s) 311-342 to which the packets are to be delivered. The up-link ports whose identification of node chips 311-342 matches one or more node chips in the identification of the node chip(s), or chip mask, is considered to be a "preferred up-link port", which will receive the data to be transmitted, unless the "preferred up-link port" is dead or is otherwise unavailable. If a preferred up-link is dead or otherwise unavailable, the port resolution module 208 may use a programmable, prioritized list of port interfaces to select an alternate up-link port interface to receive the packet instead of the preferred up-link port.

The down-link ports whose list of a single node chip 311-342 matches one of the node chips in the identification of the node chip(s) are considered to be the "active down-link ports". A "path index" is embedded in the packet, which selects which of the "active down-link ports" will be used for the packet. This path-based filtering enables a fabric chip 350a-350h to have multiple connections to a node chip 311-342.

In any regard, the fabric chips 350a-350h are to deliver the packet to the node chip(s) 311-342 that are in the identification of the node chip(s). For those node chips 311-342 contained in the identification of the node chip(s) that are connected to down-link ports of a fabric chip 350a, the fabric chip 350a may deliver the packet directly to that node chip(s) 311-314. However, for the node chips 315-342 in the identification of the node chip(s) that are not connected to down-link ports of the fabric chip 350a, the fabric chip 350a performs hardware calculations to determine which up-link port(s) the packet will traverse in order to reach those node chips 315-342. These hardware calculations are defined as "port resolution operations".

As shown in 3A, each of the fabric chips 350a-350h is connected to exactly two other fabric chips 350a-350h. In FIG. 3B, each of the fabric chips 350a-350h is depicted as being connected to two neighboring fabric chips 350a-350h through two respective trunked links 156-158 and 160-162, which are part of two separate trunks 154.

The switch fabrics 300 and 310 depicted in FIGS. 3A and 3B comprise ring network configurations, in which each of the fabric chips 350a-350h is connected to exactly two other fabric chips 350a-350h. More particularly, ports (0) and (1) of adjacent fabric chips 350a-350h are depicted in FIG. 3A as being communicatively coupled to each other. In addition, ports (0) and (1) and (10) and (11) of adjacent fabric chips 350a-350h are depicted in FIG. 3B as being communicatively connected to each other. As such, a single continuous pathway for data signals to flow through each node is provided between the network apparatuses 302a-302h.

Although the switch fabrics 300 and 310 have been depicted as including eight network apparatuses 302a-302h, with each of the network apparatuses 302a-302h including four node chips 311-342, it should be clearly understood that the switch fabrics 300 and 310 may include any reasonable number of network apparatuses 302a-302h with any reasonable number of links 152 and/or trunked links 156-162 between them without departing from the scopes of the switch fabrics 300 and 310. In addition, the network apparatuses 302a-302h may each include any reasonably suitable number of node chips 311-342 without departing from the scopes of the switch fabrics 300 and 310. Furthermore, each of the fabric chips 350a-350h may include any reasonably suitable number of port interfaces 112a-112n and ports. Still further, the network apparatuses 302a-302h may be arranged in other network configurations, such as, a mesh arrangement or other configuration.

Figure 4:
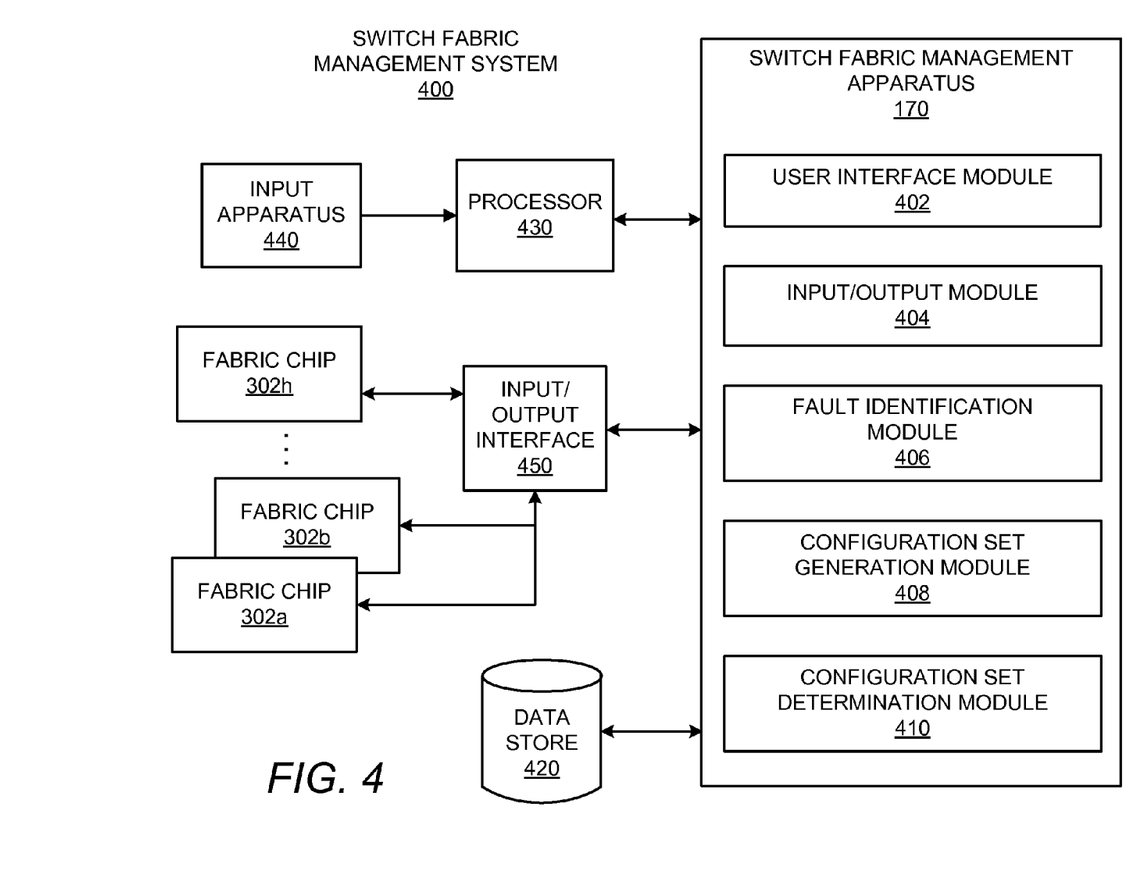
FIG. 4 shows a simplified block diagram of a switch fabric management system, according to an example of the present disclosure.

Turning now to FIG. 4, there is shown a simplified block diagram of a switch fabric management system 400 containing the switch fabric management apparatus 170 depicted in FIG. 1, according to an example. It should be apparent that the block diagram depicted in FIG. 4 represents a generalized illustration and that other components may be added or existing components may be removed, modified or rearranged without departing from a scope of the switch fabric management system 400.

As shown in FIG. 4, the switch fabric management apparatus 170 includes a user interface module 402, an input/output module 404, a fault identification module 406, a configuration set generation module 408, and a configuration set determination module 410. The modules 402-410 may comprise software modules, hardware modules, or a combination of software and hardware modules. Thus, in one example, at least one of the modules 402-410 comprises a circuit component. In another example, at least one of the modules 402-410 comprises machine-readable code stored on a computer readable storage medium, which is executable by a processor.

In any regard, a processor 430 is to use and/or execute the switch fabric management apparatus 170. Thus, for instance, the switch fabric management apparatus 170 may comprise an integrated and/or add-on hardware device of a computing device comprising the processor 430. As another example, the switch fabric management apparatus 170 may comprise a computer readable storage device upon which machine-readable instructions for each of the modules 402-410 is stored and executed by the processor 430.

As further shown in FIG. 4, the processor 430 is to receive input from an input apparatus 440. The input apparatus 440 may comprise, for instance, a user interface through which a user may input instructions to implement the switch fabric management apparatus 170. The instructions may include, for instance, an instruction to generate a new configuration set following a change to the switch fabric 300, 310.

Various information and data received and collected by the switch fabric management apparatus 170 may be stored in a data store 420, which may comprise volatile and/or non-volatile memory, such as DRAM, EEPROM, MRAM, phase change RAM (PCRAM), Memristor, flash memory, and the like. In addition, or alternatively, the data store 420 may comprise a device to read from and write to a removable media, such as, a floppy disk, a CD-ROM, a DVD-ROM, or other optical or magnetic media.

The switch fabric management system 400 also includes an input/output interface 450 through which the switch fabric management apparatus 170 sends communications to and receives communications from the fabric chips 302a-302h. The input/output interface 450 may comprise a wireless or a wired interface through which the communications may be implemented.

Figure 5:
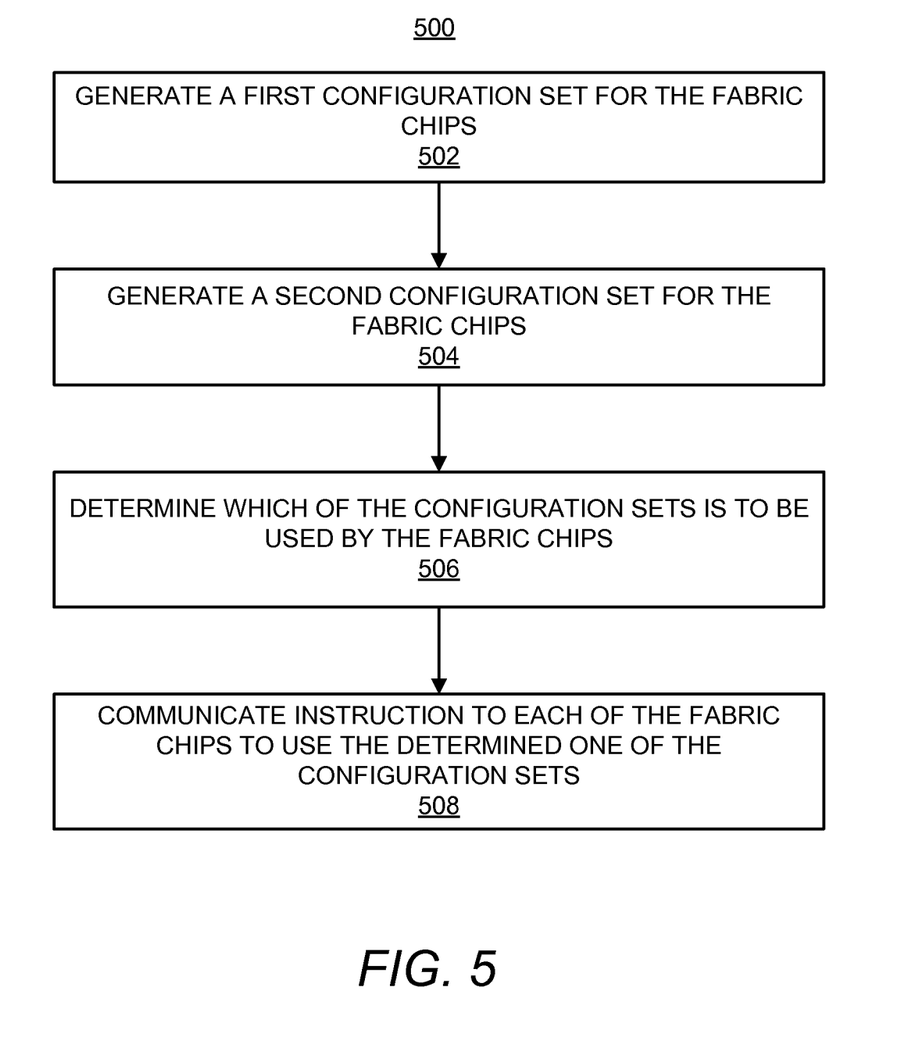
FIG. 5 shows a flow diagram of a method for managing a switch fabric, according to an example of the present disclosure.
Figure 6:
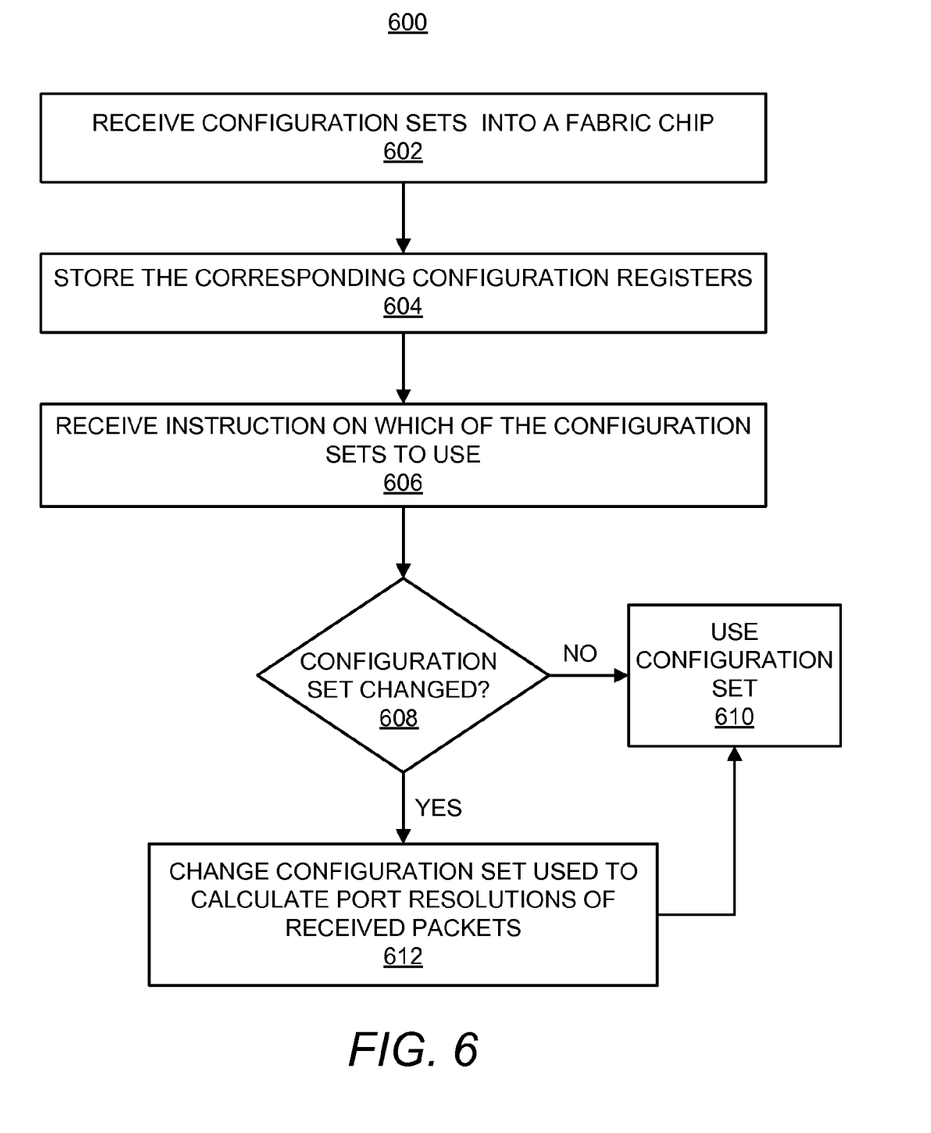

Various manners in which the processor 430 may implement the modules 402-410 of the switch fabric management apparatus 170 in the switch fabric 300, 310 are described in greater detail with respect to FIG. 5. More particularly, FIG. 5 depicts a flow diagram of a method for managing a switch fabric 300, 310 to direct packet flow in the switch fabric 300, 310, according to an example. In addition, FIG. 6 depicts a flow diagram of a method for using one of the first configuration set and the second configuration set in the port interfaces 112a-112n, according to an example. It should be apparent that the methods 500 and 600 represent generalized illustrations and that other steps may be added or existing steps may be removed, modified or rearranged without departing from the scopes of the methods 500 and 600. In addition, although particular reference is made herein to a first configuration set and a second configuration set, it should be clearly understood that any number of configuration sets may be generated and used without departing from the scopes of the method 500 and 600.

The descriptions of the methods 500 and 600 are made with particular reference to the fabric chips 110 and 350a-350h depicted in FIGS. 1-4B. It should, however, be understood that the methods 500 and 600 may be used in fabric chip(s) that differ from the fabric chips 110 and 350a-350h without departing from the scopes of the methods 500 and 600. In addition, although reference is made to particular ones of the network apparatuses 302a-302h, and therefore particular ones of the fabric chips 350a-350h and the node chips 311-342, it should be understood that the operations described herein may be performed by and/or in any of the network apparatuses 302a-302h.

In both methods 500 and 600, the packet may include various information, such as, an identification of the node chip(s) to which the packet is to be delivered, which is referred to herein as the "data-list", a fabric-port-mask, a destination-chip-node-mask, a bit mask, a chip mask, etc. A "path index" may also be embedded in the packet, which selects which of a plurality of active down-link ports are to be used to deliver the packet to the destination node chip(s) contained in the identification.

With reference first to FIG. 5, at block 502, a first configuration set comprising a plurality of configuration registers for the port interfaces 112a-112n to use in calculating a port resolution for an incoming packet is generated, for instance, by the configuration set generation module 408. The first configuration set may be generated based upon the arrangement and connections between the fabric chips 302a-302h, for instance, to substantially optimize packet flows through the switch fabric 300, 310. More particularly, and with particular reference to FIG. 3A, for instance, the first configuration set may contain a first configuration register for a first fabric chip 350a that is to cause packets received through any of ports 2-9 to be outputted through one of ports 0 and 1 if the destination node chip is not connected to any of ports 2-9. In addition, the first configuration register for the first fabric chip 350a may cause the packets to be outputted through port 0 if the destination node chip identified in the packet is located in closer proximity in the clockwise direction from the first fabric chip 350a. Likewise, the first configuration register may cause the packets to be outputted through port 1 of the first fabric chip 350a if the destination node chip is located in closer proximity in the counter-clockwise direction from the first fabric chip 350a.

In this example, the first configuration set may also contain a second configuration register for a second fabric chip 350b, which, when used by the port interfaces 112a-112n of the second fabric chip 350b, cause packets received into the second fabric chip 350b to be directed to either of ports 0 and 1 thereof depending upon which direction the packet is to flow to reach a destination node chip while traversing the least number of links. The first configuration set may contain additional configuration registers for the remaining fabric chips 350c-350h.

At block 504, a second configuration set comprising a plurality of configuration registers for the port interfaces 112a-112n to use in calculating a port resolution for an incoming packet is generated, for instance, by the configuration set generation module 408. Similarly to the first configuration set, the second configuration set may be generated based upon the arrangement and cabling between the fabric chips 302a-302h, for instance, to substantially optimize packet flows through the switch fabric 300, 310. The second configuration set, however, may account for changes to the switch fabric 300, 310 that may have occurred following use of the first configuration set by the port interfaces 112a-112n. The changes may have been intentional or may have resulted from a fault occurring in the switch fabric 300, 310.

By way of particular example, a user may manually cause the second configuration set to be generated in response to, for instance, a cabling change, the addition and/or removal of a fabric chip into the switch fabric 300, 310, etc. As another example, the second configuration set may automatically be generated in response to a determination that a fault has occurred in the switch fabric 300, 310. Such faults may include, for instance, a link between two fabric chips 300, 310 being broken due to a cabling, port interface, or fabric chip malfunction.

In either of the examples above, the statuses of the port interfaces 112a-112n in the fabric chips 350a-350h may be received, for instance, through the input/output module 404. More particularly, for instance, the input/output module 404 may receive updates from the port interfaces 112a-112n of each of the fabric chips 350a-350h indicating whether they are able to communicate the packets along their intended paths. An port interface 112a may communicate an indication that a fault has occurred if the port interface 112a is unable to verify that a packet was sent over a link to an intended destination and that the port interface 112a had to return the packet back to the fabric chip from which the packet was received. According to an example, receipt of such information from the port interface 112a may cause the fault identification module 406 to determine that a fault has occurred, thereby triggering the configuration generation module 408 to generate the second configuration set.

According to an example, the second configuration set may be communicated to and stored in each of the port interfaces 112a-112n of the fabric chips 350a-350c. In addition, a bit in each of the port interfaces 112a-112n may be set to correspond to the second configuration set, such that, an instruction to set that bit causes the port interfaces 112a-112n to begin using the second configuration set. Moreover, additional configuration sets may be generated and stored in the port interfaces 112a-112n, such that, the port interfaces 112a-112n may relatively quickly use the different configuration sets in response to changes, such as, faults, being detected in the switch fabric 300, 310. In this example, the different configuration sets may cause packets to flow through different ports of the fabric chips 300, 310.

At block 506, a determination as to which of the configuration sets the fabric chips 350a-350c is to use is made, for instance, by the configuration set determination module 410. More particularly, the configuration set determination module 410 may determine that the second configuration set is to be used in response to a fault being detected in the switch fabric 300, 310. In addition, or alternatively, the configuration set determination module 410 may receive an instruction from a user to use one of the first and the second configuration sets.

At block 508, an instruction to use the determined one of the configuration sets is communicated to each of the fabric chips 350a-350c, for instance, by the input/output module 404. According to an example, the instruction includes an instruction for the port interfaces 112a-112n to atomically begin using the determined configuration set. More particularly, for instance, the instruction includes a delay instruction for the port interfaces 112a-112n that causes the port interfaces 112a-112n to all begin using the determined configuration at the same time. In addition, the delay instruction may cause the port interfaces 112a-112n to delay performing port resolution calculations on newly received packets until after the delay has elapsed. In one regard, the delay may be set to provide sufficient time for packets that have been processed under the previous configuration set to be cleared out of the switch fabric 300, 310 prior to use of the new configuration set to thereby prevent packets from being processed under both configuration sets.

Turning now to FIG. 6, at block 602, a plurality of configuration sets comprising the plurality of configuration registers are received into the fabric chips 350a-350c. The configuration sets may comprise the first configuration set, the second configuration, as well any additional configuration sets that may be generated for the port interfaces 112a-112n of the fabric chips 350a-350h At block 604, the corresponding configuration registers contained in the configuration sets are stored in each of the port interfaces 112a-112n of the fabric chips 350a-350h. More particularly, the configuration registers pertaining to the port interfaces 112a-112n in the respective fabric chips 350a-350h are stored in the respective port interfaces 112a-112n. As such, the port interfaces 112a-112n in a first fabric chip 350a may store a different set of configurations registers as compared with the port interfaces 112a-112n in a second fabric chip 350b.

According to an example, the port interfaces 112a-112n may associate each of the configuration registers with a bit. As such, the port interfaces 112a-112n may use a particular configuration register by simply setting the appropriate bit as discussed below. In addition, or alternatively, the fabric chips 350a-350h may receive and store the configuration registers at one time or may receive and store different configuration registers at different times.

At block 606, the fabric chips 350a-350h receive an instruction on which of the configuration sets to use. In addition, at block 608, the port interfaces 112a-112n may determine whether the instruction requires them to use a different configuration set. If the instruction does not change the selected/used configuration set, then the port interfaces 112a-112n use the configuration registers in the current configuration set, as indicated at block 610. However, if the instruction does change the configuration set to be used, the port interfaces 112a-112n change the configuration registers that are used to calculate port resolutions of the received packets, as indicated at block 612. In addition, the port interfaces 112a-112n use the configuration registers of the selected configuration set, as indicated at block 610.

When the port interfaces 112a-112n begin using the configuration registers of the selected configuration set, the port interfaces 112a-112n that receive the packets may set a field in the packets that operates as a pointer to which of the configuration sets was used by the receiving port interface 112a-112n. The port interfaces 112a-112n on the opposite of the crossbars 120 may then perform operations on the packets that are coherent with the configuration set used by the receiving port interface 112a-112n. Thus, by way of example in which a packet comprises a multicast packet, the port interface 112a-112n that receives the multicast packet may identify which of the destination node chips to remove from the identification of destination node chips. In another regard, the port interfaces 112a-112n that receive multicast packets may be able to replicate port resolution calculation transformations made to the packets by the interfaces 112a-112n that communicated the multicast packets to the port interfaces 112a-112n.

According to an example, the port interfaces 112a-112n change the configuration registers being used at block 610 by setting the appropriate bit associated with the selected configuration registers. In addition, following an instruction to change the configuration registers being used, the port interfaces 112a-112n may delay processing of newly received packets to allow sufficient time for the packets that were previously processed using the old configuration set to be cleared out of the fabric switch 300, 310.

The configuration registers contained in each of the configuration sets define which of the port interfaces 112a-112n of the fabric chips 110, 350a-350h are to receive packets to be communicated to their destination node chips 130a-130m, 311-342. As such, the port interfaces 112a-112n in the fabric chips 110, 350a-350h that are to receive the packets may vary depending upon which of the configuration sets is used at any given time.

By way of particular example in which a packet is to be communicated from node chip (N4) 315 to node chip (N23) 334, the node chip (N4) 315 communicates the packet to either port (2) or (3) of the source fabric chip (FC1) 350b. As discussed above with respect to FIG. 1, the packet from the node chip 315 contains a list of the node chip(s) to which the packet is to be delivered (data-list). In this case, the list includes just the node chip (N23) 334. In addition, the port resolution module 208 of the NCR 204a of the port interface 112a through which the packet was received from the node chip 315 performs a calculation, in hardware, to determine which up-link port(s) (0-11) of the source fabric chip 350b that packet will traverse to reach the destination node chip 334. More particularly, for instance, the packet may include mini-packets (MPackets) that include destination and path information, which the port resolution module 208 may interpret in determining the up-link port(s) (0-11), which may vary depending upon which of the configuration sets the port resolution module 208 is using. As discussed above, the packet may comprise a control packet and/or a data packet. A control packet comprises at least one MPacket, whereas, a data packet comprises two or more MPackets.

In any regard, the port resolution module 208 may use this information to index into a look-up table that determines the correct NCI block 202 of the fabric chip 350b to make the next hop to the destination node chip 334. In the above example, the port resolution module 208 may determine that the NCI block 202 of the up-link port (1) is the correct NCI block 202. As such, the NCR 204a of the port interface 112a may communicate the packet to the NCI block 202 of the port interface 112n containing the up-link port (1). The port interface 112n containing the up-link port (1) may communicate the packet to the first fabric chip (FC1) 350a connected to up-link port (1).

The first fabric chip (FC1) 350a may receive the packet through up-link port (0) and the NCR 204a of the port interface 112a containing that up-link port (0) may use the information contained in the packet to determine the correct NCI block 202 of the first fabric chip 350a the packet is to be delivered to make the next hop to the destination node chip 334. In this example, the port resolution module 208 may determine that the NCI block 202 of the up-link port (1) is the correct NCI block 202. Again, the port resolution module 208 may make this determination based upon the configuration registers that are being used at the time the packet is received.

Figure 7:
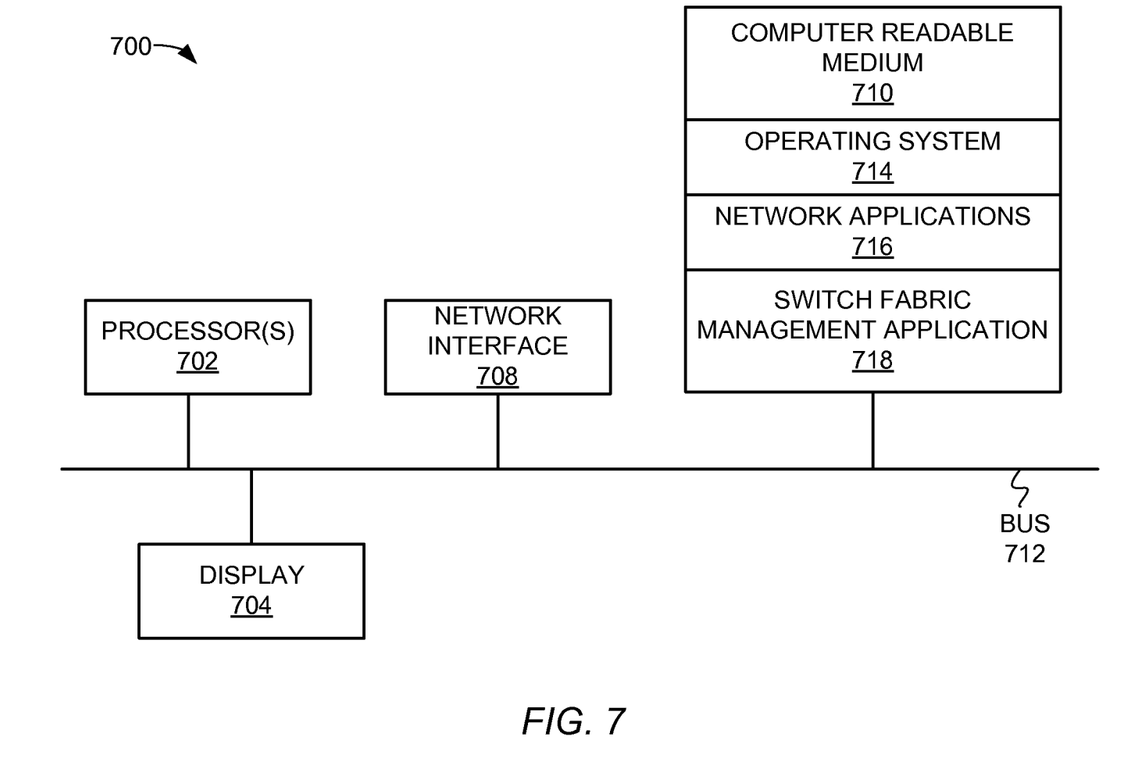
FIG. 7 shows a schematic representation of a computing device that may be used as a platform for performing or executing one or more of the processes depicted in FIG. 5, according to an example of the present disclosure.

Turning now to FIG. 7, there is shown a schematic representation of a computing device 700 that may be used as a platform for using or executing at least one of the processes depicted in FIG. 5, according an example. The device 700 includes a processor 702, such as a central processing unit; a display 704, such as a monitor; a network interface 708, such as a Local Area Network LAN, a wireless 802.11x LAN, a 3G mobile WAN or a WiMax WAN; and a computer-readable medium 710. Each of these components is operatively coupled to a bus 712. For example, the bus 712 may be an EISA, a PCI, a USB, a FireWire, a NuBus, or a PDS.

The computer readable medium 710 may be any suitable non-transitory medium that participates in providing instructions to the processor 702 for execution. For example, the computer readable medium 710 may be non-volatile media, such as an optical or a magnetic disk; volatile media, such as memory; and transmission media, such as coaxial cables, copper wire, and fiber optics. Transmission media can also take the form of acoustic, light, or radio frequency waves. The computer readable medium 710 may also store other machine-readable instructions, including word processors, browsers, email, Instant Messaging, media players, and telephony machine readable instructions.

The computer-readable medium 710 may also store an operating system 714, such as Mac OS, MS Windows, Unix, or Linux; network applications 716; and a switch fabric management application 718. The operating system 714 may be multi-user, multiprocessing, multitasking, multi-threading, real-time and the like. The operating system 714 may also perform basic tasks, such as recognizing input from input devices, such as a keyboard or a keypad; sending output to the display 704; keeping track of files and directories on medium 710; controlling peripheral devices, such as disk drives, printers, image capture device; and managing traffic on the bus 712. The network applications 716 include various components for establishing and maintaining network connections, such as machine readable instructions for using communication protocols including TCP/IP, HTTP, Ethernet, USB, and FireWire.

The switch fabric management application 718 provides various machine readable instructions for managing operations in a switch fabric composed of a plurality of fabric chips, as described above with respect to FIG. 5. Thus, for instance, the switch fabric management application 718 may include machine-readable instructions to generate a first configuration set comprising a plurality of configuration registers, to generate a second configuration set comprising a plurality of configuration registers, to determine which of the first configuration set and the second configuration set is to be used by the fabric chips, and to communicate an instruction to each of the fabric chips to use the determined one of the first configuration set and the second configuration set. In certain examples, some or all of the processes performed by the application 718 may be integrated into the operating system 714. In certain examples, the processes may be at least partially performed in digital electronic circuitry, or in computer hardware, machine-readable instructions (such as, firmware and/or software), or in any combination thereof.

What has been described and illustrated herein are various examples of the present disclosure along with some of their variations. The terms, descriptions and figures used herein are set forth by way of illustration only and are not meant as limitations. Many variations are possible within the spirit and scope of the present disclosure, in which the present disclosure is intended to be defined by the following claims—and their equivalents—in which all terms are mean in their broadest reasonable sense unless otherwise indicated.

What is claimed is:

1. A method for managing a switch fabric comprising a plurality of fabric chips, each of said plurality of fabric chips comprising a plurality of port interfaces, said method comprising:

generating a first configuration set comprising a plurality of configuration registers for the port interfaces to use in calculating a port resolution for an incoming packet;

generating a second configuration set comprising a plurality of configuration registers for the port interfaces to use in calculating a port resolution for an incoming packet, wherein the second configuration set differs from the first configuration set;

while the plurality of fabric chips are using the first configuration set, determining that the plurality of fabric chips are to use the second configuration set; and communicating an instruction to each of the plurality of fabric chips to use the second configuration set, wherein the instruction includes a delay instruction that causes the plurality of fabric chips to begin to use the second configuration set at the same time.

2. The method according to claim 1, further comprising:
storing respective ones of the first configuration set and the second configuration set in each of the plurality of fabric chips.

3. The method according to claim 2, wherein the port interfaces that receive the incoming packet is to control which of the first configuration set and the second configuration set is to be used by varying a setting of a predetermined bit in each of the port interfaces, and wherein communicating an instruction to each of the plurality of fabric chips further comprises communicating an instruction to each of the plurality of fabric chips to set the bit for the second configuration set to be used.

4. The method according to claim 3, wherein communicating an instruction to each of the plurality of fabric chips further comprises communicating an instruction to each of the plurality of fabric chips to atomically set the bit for the second configuration set to be used following a clearing out of packets whose port resolutions have been calculated using the first configuration set from the switch fabric.

5. The method according to claim 3, wherein the plurality of port interfaces in each of the plurality of fabric chips are in communication with each other over a crossbar and wherein the incoming packet is to be received into one of the plurality of port interfaces, said method further comprising:
in the port interface at which the incoming packet is received, using one of the first configuration set and the second configuration set to identify which of the port interfaces on an opposite side of the crossbar are to receive the packet and to set a field in the packet that operates as a pointer to which of the first configuration set and the second configuration set was used by the receiving port interface to enable the port interfaces on the opposite side of the crossbar to perform an operation on the packet that is coherent with the configuration set used by the receiving port interface.

6. The method according to claim 5, wherein the packet contains an identification of at least one destination node chip that is to receive the packet, and wherein using one of the first configuration set and the second configuration set further comprises comparing the identification of the at least one destination node chip contained in the identification and a preprogrammed correlation between the port interfaces and the destination node chips.

7. The method according to claim 1, further comprising:
receiving status information from the plurality of fabric chips; and
wherein generating the second configuration set further comprises generating the second configuration set based upon the received status information.

8. The method according to claim 7, wherein generating the second configuration set further comprises generating the second configuration set to substantially optimize flow of packets through the plurality of fabric chips following a change to the switch fabric.

9. The method according to claim 1, further comprising:
determining that a fault has occurred in the switch fabric; and
wherein generating the second configuration set further comprises generating the second configuration set to substantially optimize rerouting of the packets through the switch fabric while accounting for the fault.

10. An apparatus for managing use of a switch fabric composed of a plurality of interconnected fabric chips, each of said plurality of fabric chips comprising a respective plurality of port interfaces interconnected through a crossbar, said apparatus comprising:
at least one module to receive status information from the port interfaces of the plurality of fabric chips, to generate a first configuration set comprising a plurality of configuration registers for the port interfaces to use in calculating a port resolution for an incoming packet, to generate a second configuration set comprising a plurality of configuration registers for the port interfaces to use in calculating a port resolution for an incoming packet, to determine, while the plurality of fabric chips are using the first configuration set, that the plurality of fabric chips are to use the second configuration set, and to communicate an instruction to each of the fabric chips to use the second configuration set, wherein the instruction includes a delay instruction that causes the plurality of fabric chips to begin to use the second configuration set at the same time; and
a processor to implement the at least one module.

11. The apparatus according to claim 10, wherein the at least one module is to communicate an instruction to each of the plurality of fabric chips to atomically set the bit for the second configuration set to be used following a clearing out of packets whose port resolutions have been calculated using the first configuration set from the switch fabric.

12. The apparatus according to claim 10, wherein the at least one module is to generate the second configuration set based upon the received status information.

13. The apparatus according to claim 10, wherein the at least one module is to determine that a fault has occurred in the switch fabric based upon the received status information and to generate the second configuration set to substantially optimizes rerouting of received packets through the switch fabric while accounting for the fault.

14. A non-transitory computer readable storage medium on which is embedded a computer program, said computer program implementing a method for managing a switch fabric comprising a plurality of fabric chips, each of said plurality of fabric chips comprising a plurality of port interfaces, said computer program comprising a set of instructions to:
generate a first configuration set comprising a plurality of configuration registers for the port interfaces to use in calculating a port resolution for an incoming packet;
generate a second configuration set comprising a plurality of configuration registers for the port interfaces to use in calculating a port resolution for an incoming packet, wherein the second configuration set differs from the first configuration set;
determine, while the plurality of fabric chips are using the first configuration set, that the plurality of fabric chips are to use the second configuration set; and communicate an instruction to each of the fabric chips to use the second configuration set, wherein the instruction includes a delay instruction that causes the plurality of fabric chips to begin to use the second configuration set at the same time.

15. The non-transitory computer readable storage medium according to claim 14, said computer program further comprising a set of instructions to:
- receive status information from the plurality of fabric chips;
- determine that a fault has occurred in the switch fabric from the received status information; and
- generate the second configuration set to substantially optimize rerouting of the packets through the switch fabric while accounting for the fault.

* * * * *